(12) United States Patent
Haka

(10) Patent No.: US 6,942,592 B1
(45) Date of Patent: Sep. 13, 2005

(54) ALL WHEEL DRIVE/FOUR WHEEL DRIVE TRANSFER CASE WITH DIFFERENT FRONT AND REAR AXLE RATIOS

(75) Inventor: Raymond J. Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/785,694

(22) Filed: Feb. 24, 2004

(51) Int. Cl.[7] .................................................. F16H 3/44
(52) U.S. Cl. ...................... 475/311; 475/204; 475/206; 475/213; 475/295; 475/303; 475/330; 180/233; 180/247; 192/53.34; 192/48.91
(58) Field of Search ................................ 475/204, 206, 475/213, 295, 303, 311, 330; 180/233, 247; 192/48.91, 53.34

(56) References Cited

U.S. PATENT DOCUMENTS

| 4,349,091 | A |   | 9/1982 | Miyake et al. ............ 192/53 F |
|---|---|---|---|---|
| 5,989,146 | A | * | 11/1999 | Brown et al. ............... 475/207 |
| 6,142,905 | A | * | 11/2000 | Brown et al. ............... 475/206 |
| 6,464,612 | B2 | * | 10/2002 | Frost ........................... 475/288 |
| 6,575,867 | B1 | * | 6/2003 | Stephens et al. ............ 475/204 |

* cited by examiner

Primary Examiner—Tisha Lewis
Assistant Examiner—David D. Le
(74) Attorney, Agent, or Firm—Leslie C. Hodges

(57) ABSTRACT

A drivetrain for a vehicle includes front and rear axles and a transfer case including two planetary gear sets and four clutches. The first member of the first planetary gear set is continuously connected with the first member of the second planetary gear set and the rear axle. The third member of the first planetary gear set is continuously connected to the second member of the second planetary gear set and the front axle through a transfer chain. An input is selectively connectable with the first member of the first planetary gear set through a first clutch, connectable with the second member of the first planetary gear set through a second clutch, and connectable with the third member of the first planetary gear set through a third clutch. A fourth clutch selectively connects the third member of the second planetary gear set with ground. The first, second, third and fourth clutches are selectively engageable to provide front wheel drive high, four wheel drive high, all wheel drive mid, four wheel drive mid, rear wheel drive low and four wheel drive low ratios between the input and the front and rear axles.

19 Claims, 1 Drawing Sheet

ALL WHEEL DRIVE/FOUR WHEEL DRIVE TRANSFER CASE WITH DIFFERENT FRONT AND REAR AXLE RATIOS

TECHNICAL FIELD

The present invention relates to an all wheel drive transfer case incorporating different front and rear axle ratios and also providing four wheel drive.

BACKGROUND OF THE INVENTION

Four wheel drive (4WD) vehicles provide traction which is often unattainable in two wheel drive (2WD) vehicles by delivering power to both of the vehicle's axles. Attendant with the added traction provided by four wheel drive is the added complexity of the drivetrain required to control and deliver power to all four wheels as opposed to only two wheels. Four wheel drive characteristically does not have a center differential which would maintain a fixed fraction of torque delivered to each axle, but rather maintains the same speed at each axle regardless of the torque split between the two axles. The delivery of power between the front wheels and the rear wheels of the vehicle is typically handled by a transfer case mechanism which usually includes either a mechanically or electronically controlled clutch to switch between rear wheel drive and four wheel drive.

In all wheel drive (AWD) systems, the front and rear axles are continually in driving engagement with the transfer case, but the system contains a center differential to maintain a fixed ratio of torque between the front and rear axle.

In addition to controlling the transfer of torque between front and rear axles of a vehicle, the transfer case may also include a planetary gear set or set of countershaft gears which provides an underdrive or overdrive ratio. Further, rather than manufacturing a new five or six speed transmission, an existing four speed transmission may be used with a multi speed transfer case to provide additional speed ratios, such as for stump pulling (extreme underdrive), or in a top gear-overdrive condition.

All wheel drive transfer cases typically contain a planetary gear set to provide the center differential function that maintains a constant torque split between the front and rear axle independent of tire speed or slip. The vehicle is also typically equipped with identical front and rear axle ratios and identical front and rear tire rolling radii in order to minimize the power (torque related losses) circulated in the center differential. The typical all wheel drive transfer case only provides a direct or 1:1 torque ratio to the axles, and does not contain any ratio changing clutches because there is only one mode of operation. Some all wheel drive transfer cases provide a friction clutch across the center differential to dynamically change the front to rear torque ratio.

SUMMARY OF THE INVENTION

The invention provides a transfer case which provides three torque ratios, as well as the options of rear wheel drive, front wheel drive, all wheel drive and four wheel drive. It also provides the ability to shift into or out of four wheel drive "on the fly" (i.e., when the axles are spinning, but no torque is applied) in any speed ratio.

The invention also provides a drivetrain for a vehicle having front and rear axles and a transfer case which includes two planetary gear sets and four clutches. The first and second planetary gear sets each include first, second and third members. The first member of the first planetary gear set is continuously connected with the first member of the second planetary gear set and with the rear axle. The third member of the first planetary gear set is continuously connected to the second member of the second planetary gear set, and to the front axle through a transfer chain or gear set. An input is selectively connectable with the first member of the first planetary gear set through a first clutch, connectable with the second member of the first planetary gear set through a second clutch, and connectable with the third member of the first planetary gear set through a third clutch. A fourth clutch selectively connects the third member of the second planetary gear set with ground. The first, second, third and fourth clutches are selectively engageable to provide front wheel drive high, four wheel drive high, all wheel drive mid, four wheel drive mid, rear wheel drive low and four wheel drive low ratios between the input shaft and the front and rear axles.

The rear axle has a rear axle ratio which is different from the product of the front axle ratio and the transfer chain ratio.

Preferably, a simple planetary gear set is used and the first, second and third members of the first planetary gear set are a sun gear, carrier and ring gear, respectively. The first, second and third members of the second planetary gear set are a ring gear, a carrier and a sun gear, respectively.

Alternatively, the first and second planetary gear sets could be combined into a four node Ravigneaux gear set. Ravigneaux gear sets are well known in the art.

Preferably, the transfer chain has a 1:1 chain ratio. Also, preferably all of the dog clutches include a synchronizer to enable shifting while the front and rear axles are spinning.

Preferably, the first clutch is engageable to provide rear wheel drive low, the second clutch is engagable to provide all wheel drive mid, the third clutch is engageable to provide front wheel drive high, and the fourth clutch is engageable to provide four wheel drive in any of three ratios (low, mid or high).

Accordingly, the arrangement uses two different axle ratios (front axle ratio times the transfer chain ratio being different from the rear axle ratio), a center differential which has its input to the carrier of the first planetary gear set, assuming a simple planetary gear set, and a second planetary gear set with a total of four dog clutches to achieve front wheel drive high, four wheel drive high, all wheel drive mid ratio, four wheel drive mid ratio, rear wheel drive low, and four wheel drive low. The invention allows the transfer case to shift "on the fly" if a synchronizer is used on the dog clutches. It will be necessary for the vehicle to come to a complete stop to shift from one ratio (low, mid or high) to another if the dog clutches do not contain synchronizers (unless the shift is made at zero torque with the electronic throttle controlling the engine speed to match the oncoming gear synchronous speed).

The above features and advantages, and other features and advantages, of the present invention are readily apparent from the following detailed description of the best mode for carrying out the invention when taken in connection with the accompanying drawings.

DESCRIPTION OF THE PREFERRED EMBODIMENT

Figure 1:
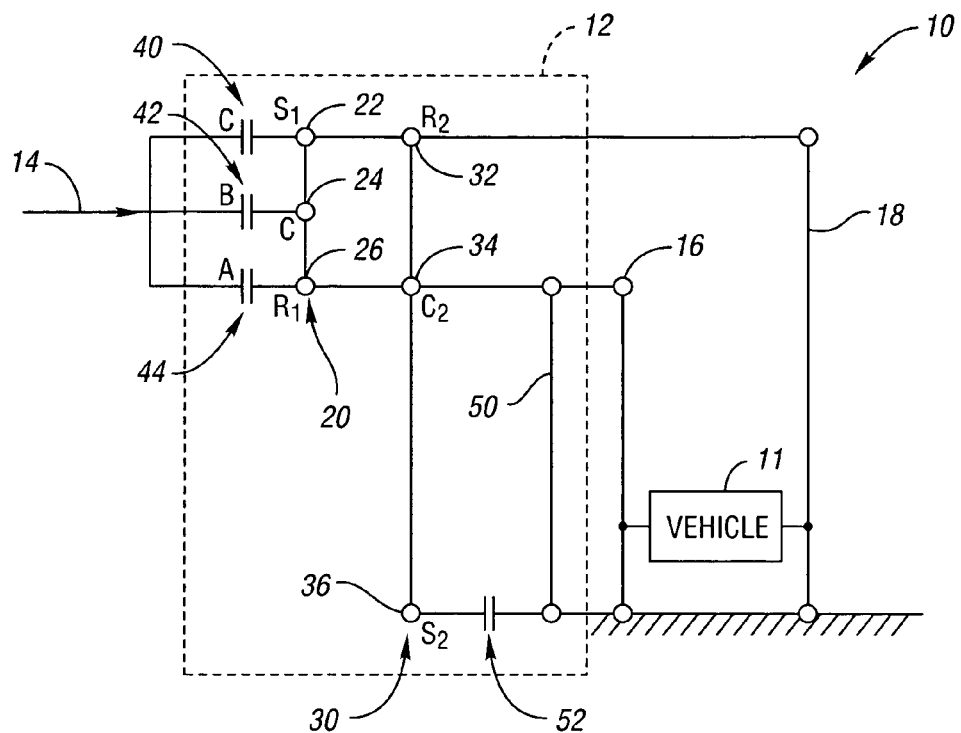
FIG. 1 shows a schematic lever diagram of a vehicle drivetrain incorporating the transfer case of the present invention.

Referring to FIG. 1, a lever diagram is shown illustrating a drivetrain 10 for a vehicle 11 incorporating a transfer case 12 for receiving torque from an input 14 and distributing the torque between the front and rear axles 16, 18 of the vehicle 11. Preferably, the front and rear axles have different axle ratios. More specifically, the rear axle ratio must be different than the product of the front axle ratio and the transfer chain ratio. The "axle ratio" is the relationship between the vehicle's drive shaft (or propeller shaft) and its wheel axle. For instance, a 4:1 or 4.0 axle ratio means its drive shaft turns four times for every one time the axle turns. The higher the axle ratio, the greater the force that can be applied to the drive wheels for tasks such as towing up a grade or pulling a boat out of the water. With the present invention, for example, the front axle 16 may have a ratio of 3.42 and the rear axle may have a ratio of 4.10. However, the invention described herein may also be applicable to a vehicle having identical front and rear axle ratios and a transfer chain ratio other than 1:1.

The transfer case 12 includes first and second simple planetary gear sets 20, 30 each including first, second and third members. The first member of the first planetary gear set 20 is the sun gear 22, the second member of the first planetary gear set is the carrier 24, and the third member of the first planetary gear set is the ring gear 26. The first member of the second planetary gear set 30 is the ring gear 32, the second member of the second planetary gear set is the carrier 34, and third member of the second planetary gear set is the sun gear 36. The sun gear 22, carrier 24 and ring gear 26 are selectively connectable with the input 14 via the clutches 40, 42, 44, respectively. The clutches 40, 42, 44 may be embodied as a single three-way dog clutch, three single dog clutches, or a single dog clutch and a dual dog clutch. Sample dog clutches for use with the present invention are shown, for example, in U.S. Pat. No. 4,349,091, which is hereby incorporated by reference in its entirety.

When the clutch 40 is engaged (and the others are disengaged), the input 14 is connected to the sun gear 22 and to the rear axle 18 to provide a rear wheel drive low mode. When the clutch 42 is engaged (and the others are disengaged), the input 14 is connected to the carrier 24 and the vehicle is in all wheel drive mode in which the torque is split between the front and rear axles 16, 18. When the clutch 44 is engaged (and the others are disengaged), the input 14 is connected to the ring gear 26 and the front axle 16 (through the transfer chain 50) to provide a front wheel drive high ratio.

The ring gear to sun gear tooth ratio of the planetary gear set 20 combined with the axle ratios of the front and rear axles 16, 18 will determine the front to rear torque split and the effective all wheel drive axle ratio, as defined in the following formulas:

$$\text{Fraction of Torque on the front axle} = \frac{(\text{Ring}/(\text{Ring}+\text{Sun}))\times \text{Front axle ratio}\times \text{Chain Ratio}}{(\text{Ring}/(\text{Ring}+\text{Sun}))\times \text{Front axle ratio}\times \text{Chain Ratio} + (\text{Sun}/(\text{Ring}+\text{Sun}))\times \text{Rear axle ratio}}$$

Effective AWD axle ratio= ((Ring/(Ring+Sun))×Front axle ratio×Chain ratio+((Sun/(Ring+Sun))×Rear axle ratio)

In the above formulas, the terms "ring" and "sun" refer to the tooth counts of the ring gear 26 and sun gear 22 of the first planetary gear set 20. It should be obvious to those skilled in the art that the tire rolling radius can also be used to change the effective axle ratio, front to rear.

As further shown in FIG. 1, the transfer case 12 also includes a transfer chain 50 having a 1:1 chain ratio, and a fourth clutch 52, which is preferably a braking dog clutch and synchronizer.

Figure 2:
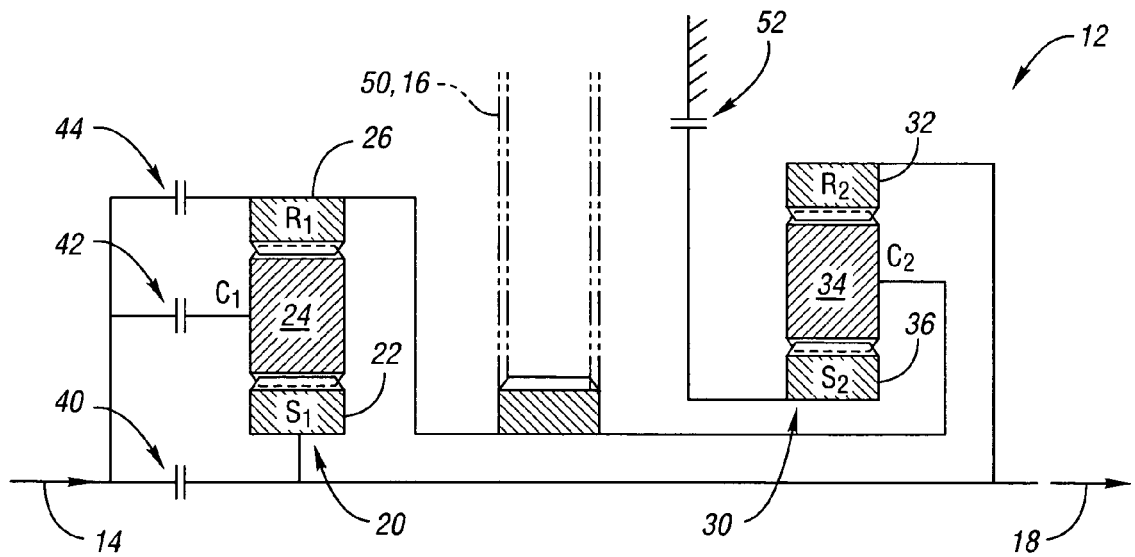
FIG. 2 shows a schematic stick diagram corresponding with FIG. 1.

Referring to FIG. 2, a stick diagram is shown for the transfer case 12 of FIG. 1, wherein like reference numerals refer to like components from FIG. 1.

In order to provide front wheel drive high, the clutch 44 is engaged, so torque flows from the input 14 through the ring gear 26 and carrier 34 to the chain 50. For four wheel drive high, the clutches 44 and 52 are engaged so torque flows from the input shaft through the ring gear 26 to the chain 50, and through the carrier 34 and ring gear 32 to the rear axle 18. The front and rear axles 16, 18 spin at the same speed.

To provide the all wheel drive mid ratio, the clutch 42 is engaged, and torque is split between the ring gear 26 and sun gear 22. Power flows from the carrier 24 to the ring gear 26 to the chain 50, and from the carrier 24 through the sun gear 22 to the rear axle 18. This provides a fixed torque split between the front and rear axles, while speeds may vary.

In order to provide a four wheel drive mid ratio, the clutches 42 and 52 are engaged so the speed ratio between the front and rear axles 16, 18 is fixed, and the front and rear axles spin at the same speed because of the ratio of the ring gear 32 to the sun gear 36. Torque flows from the input 14 to the carrier 24 through the ring gear 26 to the chain 50, and through the sun gear 22 to the rear axle 18.

In rear wheel drive low, the clutch 40 is engaged, and torque travels from the input 14 directly to the rear axle 18.

In four wheel drive low, the clutches 40 and 52 are engaged. The ratio of the ring gear 32 to the sun gear 36 makes the front propeller shaft spin slower than the rear propeller shaft, but the front and rear axles 16, 18 spin at the same speed.

Because the clutch 52 is a dog clutch and synchronizer, "shift on the fly" is enabled wherein four wheel drive may be engaged or disengaged when the axles are rotating, but no torque is present. For a dynamic shift, the dog and synchronizer 52 must be replaced with a friction clutch.

The arrangement of front wheel drive high and rear wheel drive low is ideal for a passenger truck. In two wheel drive, the transfer case will place the vehicle in front wheel drive for the economy ratio, and rear wheel drive for the "tow haul" or performance ratio. An unloaded pickup truck will have the majority of the vehicle weight on the front wheels, and achieve maximum fuel economy with maximum traction in the front wheel drive high mode. Fully loaded, the same pickup truck will have the majority of the vehicle weight on the rear wheels and need the improved performance of the rear wheel drive low mode. The all wheel drive mode will be required for low coefficient of friction surfaces (mud or snow) where the tractive effort will be limited by the low coefficient of friction, not the axle ratio or front to rear torque split.

The system does have an additional loss mechanism (relative to a conventional all wheel drive system with identical axle ratios) in that the center differential now has power (torque and speed) cycling through it even when the front and rear axles spin at the same speed. This would cause a small amount of torque related losses in the planetary gear set 20 when driving in the all wheel drive mode. The magnitude of these losses are in the range of 0.1% to 0.2% when using a rear axle ratio 1.3 times the front axle torque ratio with a 2:1 ring gear to sun gear ratio simple planetary center differential in the planetary gear set 20.

This kinematic arrangement will work well with dog clutches due to the high level of torque going into the transfer case. If it is desirable to use friction clutches, the low-high shift could be made dynamically, but there would be considerable expense making the clutches large enough to carry the transfer case input torque. There would also be a disadvantage of increased spin losses of the open clutches.

The arrangement may alternatively be executed with the front axle connected to the sun gear of the first planetary gear set (i.e., the left gear set of FIG. 1), in which case the above equations related to torque split and effective all wheel drive axle ratio can still be used, but it is necessary to exchange the sun gear tooth count for the ring gear tooth count. The arrangement can also be executed with a compound planetary gear set if it is necessary to obtain a ring gear to sun gear ratio less than 1.5:1 in a simple planetary gear set. In this situation, the front and rear axles can be connected to either the sun gear or carrier of the first planetary gear set, and the all wheel drive input must be connected to the ring gear of the first planetary gear set. When the rear axle is connected to the sun gear 22, as shown in FIG. 1, the equations governing the torque split and net all wheel drive axle ratio are as follows:

$$\text{Fraction of Torque on the front axle} = \frac{((\text{Ring} - \text{Sun})/\text{Ring}) \times \text{Front axle ratio} \times \text{Chain Ratio}}{((\text{Ring} - \text{Sun})/\text{Ring}) \times \text{Front axle ratio} \times \text{Chain Ratio} + (\text{Sun}/\text{Ring}) \times \text{Rear axle ratio}}$$

Effective AWD axle ratio= ((Ring−Sun)/Ring)×Front axle ratio×Chain ratio+(Sun/Ring)×Rear axle ratio In the above equations, the terms "ring" and "sun" refer to the ring gear tooth count and sun gear tooth count in the first planetary gear set. Note the effective all wheel drive axle ratio is always between the front and rear axle ratios.

The connections may be interchangeable in simple and compound planetary gear sets, but in all wheel drive mode, the input is always connected to the middle member on the lever diagram. Another way of defining this commonality between the simple and compound planetary gear sets is that in the all wheel drive mode, the absolute value of the torque of the middle member in the lever diagram is equal to the sum of the absolute values of the torques of the other two members of the planetary gear set. Accordingly, in the simple planetary gear set 20 of FIG. 1, the absolute value of the torque of the carrier 24 (the middle member) is equal to the absolute value of the torque of the sun gear 22 plus the absolute value of the torque of the ring gear 26.

Referring to FIG. 1, the planetary gear set 30 is configured so that the front axle shaft 16 is connected to the carrier 34 of the planetary gear set 30, and the rear axle shaft 18 is connected to the ring gear 32 of the planetary gear set 30. The ring gear to sun gear tooth ratio of the planetary gear set 30 must be carefully selected to have the ring and carrier speed ratio exactly match the front and rear propeller shaft speed ratio when the sun gear 36 is grounded. The following formula applies for a simple planetary gear set 30:

$$R/S = \frac{1/\text{rear axle ratio}}{(1/\text{front axle ratio} \times \text{chain ratio}) - (1/\text{rear axle ratio})}$$

The required planetary gear ratio can also be obtained with a compound planetary gear set in place of the planetary gear set 30. In this situation, the ring gear must be connected to the front axle (lowest numerical ratio) and the sun and carrier can be connected to either the rear axle or ground. If the sun is connected to ground, the ring to sun ratio must satisfy the following equation:

$$R/S = \frac{\text{rear axle ratio}}{\text{rear axle ratio} - (\text{front axle ratio} \times \text{chain ratio})}$$

With the correct ring to sun ratio simple planetary gear set, the sun gear can be grounded and the vehicle will provide four wheel drive high, mid and low ranges. When the transfer case input is directed to the carrier 34 and front axle 16, the rear axle propeller shaft will be overdriven by the exact speed ratio required to cause the front and rear axles to spin at the same speed. The front axle will then accept whatever fraction of the input torque is required to satisfy the front tires, and the balance of the input torque will be directed to the rear axle 18. This will result in four wheel drive high. If the transfer case input torque is directed to the ring gear 32 and rear axle 18, the front axle 16 will be underdriven by the exact speed ratio required to cause the front axle and rear axle to spin at the same speed. The rear axle will accept whatever fraction of input torque is required to satisfy the rear tires, and the balance of the input torque will be directed to the front axle. This will result in four wheel drive low.

In summary, four wheel drive transfer cases typically contain a two speed planetary gear set to provide low (typically 3:1 underdrive) and a high range (typically direct). The vehicle also is typically equipped with identical front and rear axle ratios and identical front and rear tire rolling radii. This typical transfer case will then offer the option of rear drive direct, four wheel drive direct, and four wheel drive low. However, the present invention achieves rear wheel drive low, all wheel drive mid, front wheel drive high, as well as four wheel drive low, four wheel drive mid and four wheel drive high by providing the extra dog clutch 52 in addition to the clutches 40, 42, 44 and the planetary gear sets 20, 30.

While the best mode for carrying out the invention has been described in detail, those familiar with the art to which this invention relates will recognize various alternative designs and embodiments for practicing the invention within the scope of the appended claims.

What is claimed is:

1. A drivetrain for a vehicle comprising front and rear axles and a transfer case including:
   a first planetary gear set including first, second and third members;
   a second planetary gear set including first, second and third members;
   said first member of said first planetary gear set being continuously connected with said first member of said second planetary gear set and said rear axle;

said third member of said first planetary gear set being continuously connected to said second member of said second planetary gear set and said front axle through a transfer chain;

an input selectively connectable with said first member of said first planetary gear set through a first clutch, connectable with said second member of said first planetary gear set through a second clutch, and connectable with said third member of said first planetary gear set through a third clutch;

a fourth clutch selectively connecting said third member of said second planetary gear set with ground;

said first, second, third and fourth clutches being selectively engageable to provide front wheel drive high, four wheel drive high, all wheel drive mid, four wheel drive mid, rear wheel drive low and four wheel drive low ratios between said input and said front and rear axles.

2. The drivetrain of claim 1, wherein the rear axle has a rear axle ratio which is different from the product of the front axle ratio of the front axle and the transfer chain ratio of the transfer chain.

3. The drivetrain of claim 1, wherein said first, second and third members of said first planetary gear set comprise a sun gear, carrier and ring gear, respectively.

4. The drivetrain of claim 1, wherein said first, second and third members of said second planetary gear set comprise a ring gear, a carrier and a sun gear, respectively.

5. The drivetrain of claim 1, wherein said first, second and third members of said first planetary gear set comprise a sun gear, carrier and ring gear, respectively; and wherein said first, second and third members of said second planetary gear set comprise a ring gear, a carrier and a sun gear, respectively.

6. The drivetrain of claim 1, wherein said transfer chain has a 1:1 chain ratio.

7. The drivetrain of claim 1, wherein said first, second, third and fourth clutches comprise dog clutches.

8. The drivetrain of claim 1, wherein said first clutch is engageable to provide rear wheel drive low, said second clutch is engageable to provide all wheel drive mid, said third clutch is engageable to provide front wheel drive high, and said fourth clutch is engageable to provide four wheel drive.

9. The drivetrain of claim 1, wherein said fourth clutch includes a synchronizer to enable shifting into and out of four wheel drive while the front and rear axles are spinning.

10. A transfer case for a vehicle having a front and rear axles, the transfer case comprising:

first and second planetary gear sets each having first, second and third members;

said first member of said first planetary gear set being continuously connected with said first member of said second planetary gear set and continuously connected with the rear axle;

said third member of said first planetary gear set being continuously connected to said second member of second planetary gear set and continuously connected with the front axle through a transfer chain; and four clutches engaged with members of said first and second planetary gear sets for selectively providing front wheel drive high, four wheel drive high, all wheel drive mid, four wheel drive mid, rear wheel drive low and four wheel drive low ratios between an input and the front and rear axles.

11. The transfer case of claim 10, wherein said first, second, third and fourth clutches comprise dog clutches.

12. The transfer case of claim 10, wherein said first, second and third members of said first planetary gear set comprise a sun gear, carrier and ring gear, respectively.

13. The transfer case of claim 10, wherein said first, second and third members of said second planetary gear set comprise a ring gear, a carrier and a sun gear, respectively.

14. The transfer case of claim 10, wherein said first, second and third members of said first planetary gear set comprise a sun gear, carrier and ring gear, respectively; and wherein said first, second and third members of said second planetary gear set comprise a ring gear, a carrier and a sun gear, respectively.

15. The transfer case of claim 10, wherein said transfer chain has a 1:1 chain ratio.

16. The transfer case of claim 10, wherein said input is selectively connectable with said first member of said first planetary gear set through a first clutch, connectable with said second member of said first planetary gear set through a second clutch, and connectable with said third member of said first planetary gear set through a third clutch; and said third member of said second planetary gear set being selectively connectable with ground through a fourth clutch.

17. The transfer case of claim 16, wherein said first clutch is engageable to provide rear wheel drive low, said second clutch is engageable to provide all wheel drive mid, said third clutch is engageable to provide front wheel drive high, and said fourth clutch is engageable to provide four wheel drive.

18. The transfer case of claim 17, wherein said fourth clutch includes a synchronizer to enable shifting into and out of four wheel drive while the front and rear axles are rotating.

19. A drivetrain for a vehicle comprising front and rear axles having different axle ratios, and a transfer case including:

first and second planetary gear sets each having a sun gear, a carrier and a ring gear;

said sun gear of the first planetary gear set being continuously connected with said ring gear of said second planetary gear set and said rear axle;

said ring gear of said first planetary gear set being continously connected with said carrier of said second planetary gear set and said front axle through a transfer chain;

an input selectively connectable with said sun gear of said first planetary gear set through a first clutch, connectable with said carrier of said first planetary gear set through a second clutch, and connectable with said ring gear of said first planetary gear set through a third clutch; and a fourth clutch selectively connecting said sun gear of said second planetary gear set with ground;

wherein said first clutch is engageable to provide rear wheel drive low, said second clutch is engageable to provide all wheel drive, said third clutch is engageable to provide front wheel drive high, and said fourth clutch is engageable to provide four wheel drive.

* * * * *